(12) United States Patent
Jungmann

(10) Patent No.: US 11,137,042 B2
(45) Date of Patent: Oct. 5, 2021

(54) WEAR MONITORING DEVICE AND DISK BRAKE HAVING A WEAR MONITORING DEVICE

(71) Applicant: WABCO Europe BVBA, Brussels (BE)

(72) Inventor: Hans-Christian Jungmann, Gorxheimertal (DE)

(73) Assignee: WABCO EUROPE BVBA

( * ) Notice: Subject to any disclaimer, the term of this patent is extended or adjusted under 35 U.S.C. 154(b) by 139 days.

(21) Appl. No.: 16/330,431

(22) PCT Filed: Sep. 7, 2017

(86) PCT No.: PCT/EP2017/001059
§ 371 (c)(1),
(2) Date: Mar. 5, 2019

(87) PCT Pub. No.: WO2018/050272
PCT Pub. Date: Mar. 22, 2018

(65) Prior Publication Data
US 2020/0340542 A1 Oct. 29, 2020

(30) Foreign Application Priority Data
Sep. 15, 2016 (DE) ...................... 10 2016 011 190.9

(51) Int. Cl.
*F16D 66/02* (2006.01)
*F16D 65/12* (2006.01)
*F16D 65/02* (2006.01)

(52) U.S. Cl.
CPC ........... *F16D 66/024* (2013.01); *F16D 65/12* (2013.01); *F16D 66/027* (2013.01); *F16D 2065/132* (2013.01)

(58) Field of Classification Search
CPC ...... F16D 65/12; F16D 66/024; F16D 66/027; F16D 66/026; F16D 66/023; F16D 66/021; F16D 2065/132
(Continued)

(56) References Cited

U.S. PATENT DOCUMENTS

| | | | |
|---|---|---|---|
| 2008/0257657 A1* | 10/2008 | Siebke | F16D 66/00 188/1.11 L |
| 2016/0146279 A1* | 5/2016 | Philpott | B60T 8/885 188/1.11 L |
| 2019/0032739 A1* | 1/2019 | Krause | B60T 17/04 |

FOREIGN PATENT DOCUMENTS

| | | |
|---|---|---|
| DE | 2450761 A1 | 4/1976 |
| DE | 3816949 A1 | 12/1988 |

(Continued)

OTHER PUBLICATIONS

Translation of German Patent DE 102014105561 obtained from website: https://worldwide.espacenet.com on Sep. 15, 2020.*
(Continued)

*Primary Examiner* — Pamela Rodriguez
(74) *Attorney, Agent, or Firm* — Dickinson Wright PLLC

(57) ABSTRACT

A wear monitoring device of a disk brake includes a brake disk, a first brake lining on a first face of the brake disk, and a second brake lining on a second face of the brake disk, in particular for commercial vehicles. The wear monitoring device has a first sensor unit that quantitatively ascertains the cumulative wear of the first and second brake linings. The wear monitoring device outputs, at the output connection of the first sensor unit, a first electrical output signal that is associated with the cumulative wear. A signal line is connected on the one hand to the output connection of the first sensor unit and on the other hand to an evaluating unit. The signal line is arranged in such a manner that, when a predetermined first wear limit of the first or second brake
(Continued)

lining is reached, the signal line comes into contact with a stop.

15 Claims, 5 Drawing Sheets

(58) Field of Classification Search
USPC .......................... 188/1.11 L, 1.11 W, 1.11 E
See application file for complete search history.

(56) References Cited

FOREIGN PATENT DOCUMENTS

| | | |
|---|---|---|
| DE | 4312377 A1 | 10/1993 |
| DE | 4243875 A1 | 7/1994 |
| DE | 10132968 A1 | 1/2003 |
| DE | 69824408 T2 | 6/2005 |
| DE | 102012006105 A1 | 9/2013 |
| DE | 102012017961 A1 | 3/2014 |
| DE | 102013112527 A1 | 5/2015 |
| DE | 102014105561 A1 | 10/2015 |
| EP | 0381947 A2 | 8/1990 |
| EP | 0492143 A1 | 7/1992 |
| EP | 2687746 A1 | 1/2014 |

OTHER PUBLICATIONS

European Patent Office, Rijswijk, Netherlands, International Search Report of International Application No. PCT/EP2017/001059, dated May 18, 2018, 3 pages.

* cited by examiner

WEAR MONITORING DEVICE AND DISK BRAKE HAVING A WEAR MONITORING DEVICE

TECHNICAL FIELD

The invention relates to a wear monitoring device of a disk brake that comprises a brake disk, a first brake lining, which lies on a first face of the brake disk, and a second brake lining, which lies on a second face of the brake disk, in particular for commercial vehicles, the wear monitoring device having a first sensor unit that quantitatively ascertains the cumulative wear of the first brake lining and second brake lining and outputs at the output connection of the first sensor unit a first electrical output signal that is associated with the cumulative wear, the wear monitoring device having an evaluating unit and a signal line that is connected on the one hand to the output connection of the first sensor unit and on the other hand to the evaluating unit.

BACKGROUND

Wear monitoring devices of the type mentioned in the introduction are known by way of example from DE 43 12 377 A1. According thereto, not only is the first sensor unit provided for the cumulative wear of the first brake lining and second brake lining but in addition a second sensor unit is provided that ascertains the wear only of one of the two brake linings. This wear-ascertaining facility, that is provided in addition to ascertaining the cumulative wear, is in particular then necessary if it is to be expected or at least it is not possible to exclude that the two brake linings wear to different extents. As a result, it is possible to avoid the case that although the two brake linings jointly still have sufficient friction lining the brake lining that has worn to a greater extent does however exceed the limit of the admissible wear without being noticed.

The first sensor unit ascertains the cumulative wear in most cases quantitatively, which means that the first electrical output signal that is generated by the sensor unit changes continuously or in steps with the wear. In response to this output signal, the evaluating unit then generates a corresponding signal, by way of example for actuating an indicator that displays the respective state of wear so as to display a bar or the like that increases or shortens in length according to the wear.

In contrast thereto, the second sensor unit is a device of the type "black/white". It is namely by way of example only ascertained whether a predetermined wear limit is reached or not.

It is a complex procedure to also provide a second sensor unit in addition to the first sensor unit that ascertains the cumulative wear.

SUMMARY

The object of the invention is therefore to further develop the wear monitoring device of the type mentioned in the introduction in such a manner that not only is the cumulative wear ascertained but rather also at least one of the two brake linings is monitored to establish if it has reached the predetermined wear limit, wherein the outlay required for this is however to be maintained as low as possible.

In accordance with the invention, the object described is achieved by virtue of the fact that the signal line that is connected on the one hand to the output connection of the first sensor unit and on the other hand to the evaluating unit is arranged in such a manner that, in the event that a predetermined first wear limit of the first brake lining or of the second brake lining is reached, the signal line comes into contact with a stop.

The fact that the signal line comes into contact with the first stop may be used in a simple manner so as to ascertain whether the predetermined first wear limit has been reached. Since the signal line that is already provided is used for this purpose, the outlay is particularly low.

Whether the predetermined first wear limit is the wear limit of the first brake lining or of the second brake lining depends upon which of the two brake linings is potentially the one with the most wear.

In accordance with the invention, the signal line that is already provided for connecting the first sensor unit to the evaluating unit represents a second sensor unit.

According to one particularly preferred embodiment, it is provided in accordance with the invention that the evaluating unit is configured so as, in response to the signal line coming into contact with the stop, to output a first warning signal that is associated with the first wear limit.

According to this embodiment of the invention, the evaluating unit is not only used to further process the first electrical output signal that is output by the first sensor unit but rather is also used for evaluating whether the signal line comes into contact with the stop. This keeps the total outlay low.

In accordance with the invention it is further provided that the stop is configured on a component that has a predetermined electrical potential.

If the signal line comes into contact with this component, the signal line is then drawn to the electrical potential of the component that comprises the stop. This change in potential may be detected by the evaluating unit and evaluated in the sense that the first wear limit is reached.

At least in the case of this embodiment, the contact of the signal line with the component that comprises the stop represents a galvanic electrical contact, so that the signal line may adopt the potential of the component.

It is further preferred in accordance with the invention that the signal line is arranged in such a manner that, in the event that a predetermined second wear limit of the first brake lining or of the second brake lining is reached, the signal line is severed.

As a result of the signal line being severed, the evaluating unit no longer receives a signal from the signal line. This fact may be further processed by the evaluating unit in such a manner that it outputs a second warning signal.

By way of example, the first wear limit may be predetermined in such a manner that although it is safe to continue to use the brake, the particular brake lining is however already so well worn that it will require replacing soon. In contrast, the second wear limit may represent the state of wear of the relevant brake lining at which it is no longer safe to continue to use the brake lining but rather it is necessary to replace the brake lining immediately.

It is therefore provided according to a further preferred embodiment of the invention that the evaluating unit is configured so as to output a second warning signal in response to the signal line being severed.

This warning signal notifies the user of the brake that further operation of the brake is unsafe and that it is necessary to replace the relevant brake lining.

In principle, the stop may be configured on or attached to each component of the brake, the spacing between the stop and the signal line changing, in particular reducing, in dependence upon the wear. However, it is preferred in accordance with the invention that the component that comprises the stop is the brake disk.

It is further preferred in accordance with the invention that the signal line lies at least in sections within a friction lining of the first brake lining or of the second brake lining. As a consequence, a particularly simple possibility is created: on the one hand to move the signal line according to the lining wear and on the other hand to provide protection against environmental influences. For this purpose, the signal line may be embedded in the friction lining by a molding procedure or the like. However, it is also possible in accordance with the invention for the signal line to lie within the friction lining insofar as the signal line is arranged by way of example within a groove in the friction lining. Such a groove already provides appropriate protection against the environmental influences.

It is further preferred that the first sensor unit comprises a potentiometer or a Hall sensor. It is possible using these two components to ascertain the cumulative wear in a sufficiently precise manner.

The evaluating unit and the sensor unit may be configured separately from one another. However, according to a further preferred embodiment of the invention, a housing is provided in which the evaluating unit and at least one part of the sensor unit are accommodated. It is possible, using such a common housing, for the wear monitoring device in accordance with the invention to be configured in a particularly compact manner.

The signal line is an expendable part. It is therefore preferably provided in accordance with the invention that the signal line may be replaced as a separate component. In this manner, the outlay during maintenance work is reduced because only the expendable part "signal line" needs to be replaced but other (expensive) components, such as possibly the first sensor, do not need to be replaced.

The invention also provides a disk brake having a wear monitoring device that is configured as described above.

The invention is explained in greater detail below on the basis of a preferred exemplary embodiment with reference to the attached drawing with further details.

DETAILED DESCRIPTION

Figure 1:
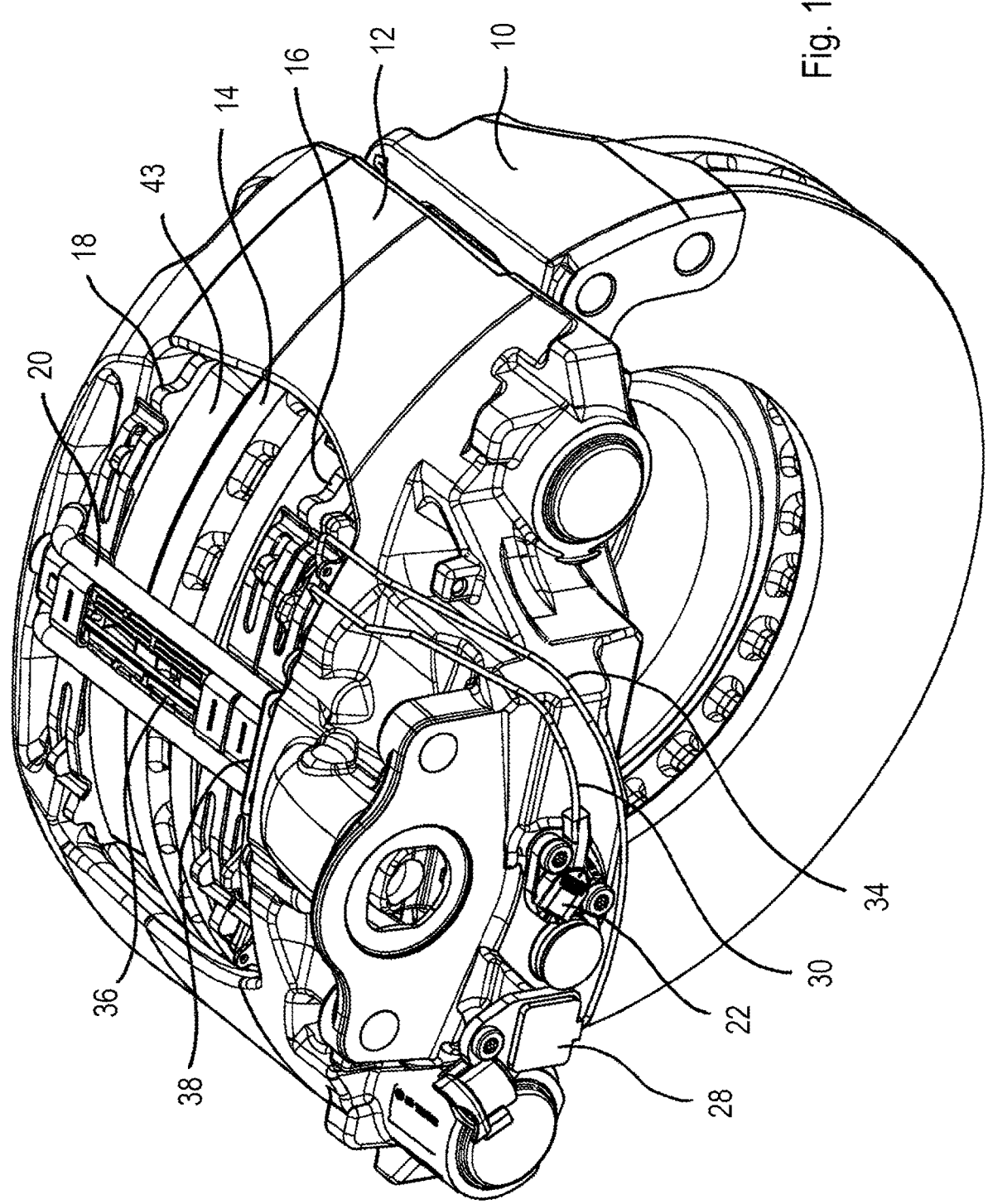
FIG. 1 illustrates a schematic perspective view of a disk brake using a preferred exemplary embodiment of the wear monitoring device in accordance with the invention, FIGS. 2 and 3 each illustrate schematic partial views of the disk brake according to FIG. 1.

The disk brake illustrated in the drawing comprises a brake carrier 10, a brake caliper 12 that is mounted in such as a manner as to be able to slide, a brake disk 14, a first brake lining 16 and a second brake lining 18. The first brake lining 16 and the second brake lining 18 are held down by a holding-down bracket 20.

The disk brake is provided with a wear monitoring device that comprises a first sensor 22. The first sensor 22 is a potentiometer that is supported on the one hand on the brake caliper 12 and on the other hand on the first brake lining 16 that is arranged on the brake-application side. The output signal U30 that is output by the first sensor 22 at its output connection 24 consequently corresponds to the cumulative wear of the first brake lining 16 and second brake lining 18. The output connection 24 is connected via a signal line 26 to an evaluating unit 28. The signal line 26 comprises a first section 30 and a second section 34. A sensing piece 32 is provided, the signal line 26 being embedded in the sensing piece. The sensing piece 32 in the exemplary embodiment illustrated in the drawing is a synthetic component. The sensing piece is arranged in such a manner that the first section 30 leads away from the first sensor 22 towards the sensing piece and the second section 34 leads from the sensing piece to the evaluating unit 28. The sensing piece 32 is used for the purpose of holding the signal line 26 in a predetermined position. On account of the above described arrangement, the output signal U30 that is output by the output connection 24 of the first sensor 22 is transmitted via the first section 30 and the second section 34 to the evaluating unit 28. A frame that is described overall by the reference numeral 36, a perforated plate 38 and a tab 40 that in the assembled state lies on the brake caliper 12 are used so as to position and hold the sensing piece 32.

The sensing piece 32 is arranged in such a manner that as the wear of the brake lining 18 increases, the sensing piece comes into contact with the brake disk 14 during a braking procedure. As a result, the sensing piece is gradually worn down. The sensing piece is arranged in such a manner that, in the event that a first wear limit of the second brake lining 18 is reached, the signal line 26 comes into contact with the brake disk 14 during a braking procedure. Subsequently, namely as a result of the sensing piece 32 being gradually worn down, the signal line is exposed on the side facing the brake disk 14. This contact of the signal line 26 with the brake disk 14 results in the signal line 26 being drawn to the electrical potential of the brake disk 14 (generally to ground). In the event that a second wear limit of the second brake lining 18 is reached, the signal line 26 is destroyed by the brake disk 14 and as a result severed.

The geometric relationships are selected in the case of the exemplary embodiment of the invention illustrated in the drawing in such a manner that, although it is still safe to continue to use the brake in the event that the first wear limit is reached, the second brake lining 18 is however already so well worn that it will require replacing soon. In the event that the second wear limit is reached, it is no longer possible to continue to use the second brake lining 18 safely but rather it is necessary to replace the brake lining immediately.

The above described embodiment corresponds to the expectation that the second brake lining 18 wears to a greater extent than the first brake lining 16, which is why the second brake lining 18 is monitored separately. If it should be expected that the first brake lining 16 wears to a greater extent than the second brake lining 18, it is possible within the scope of the invention to also monitor the first brake lining 16 separately.

Figure 2:
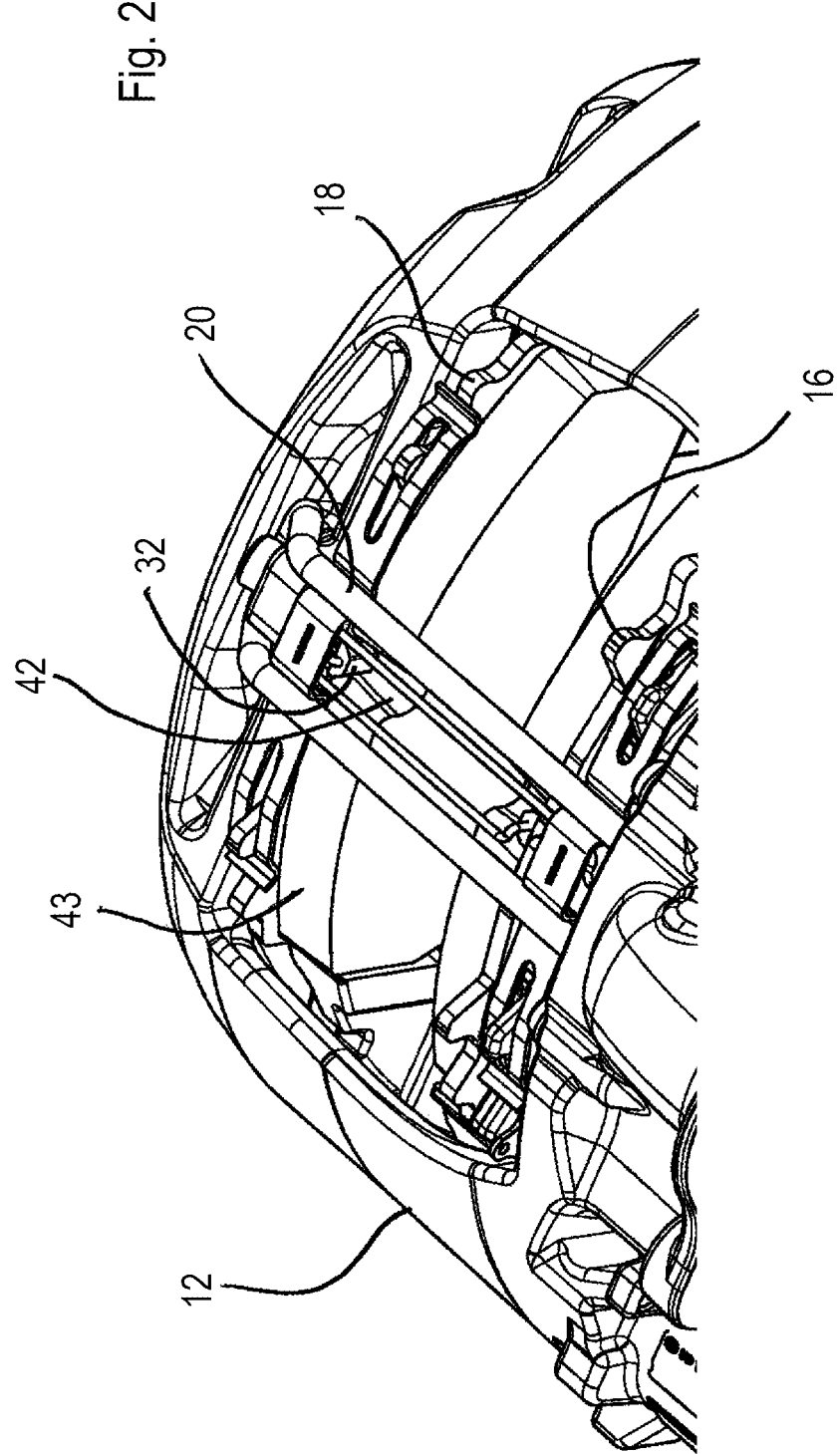
Figure 3:
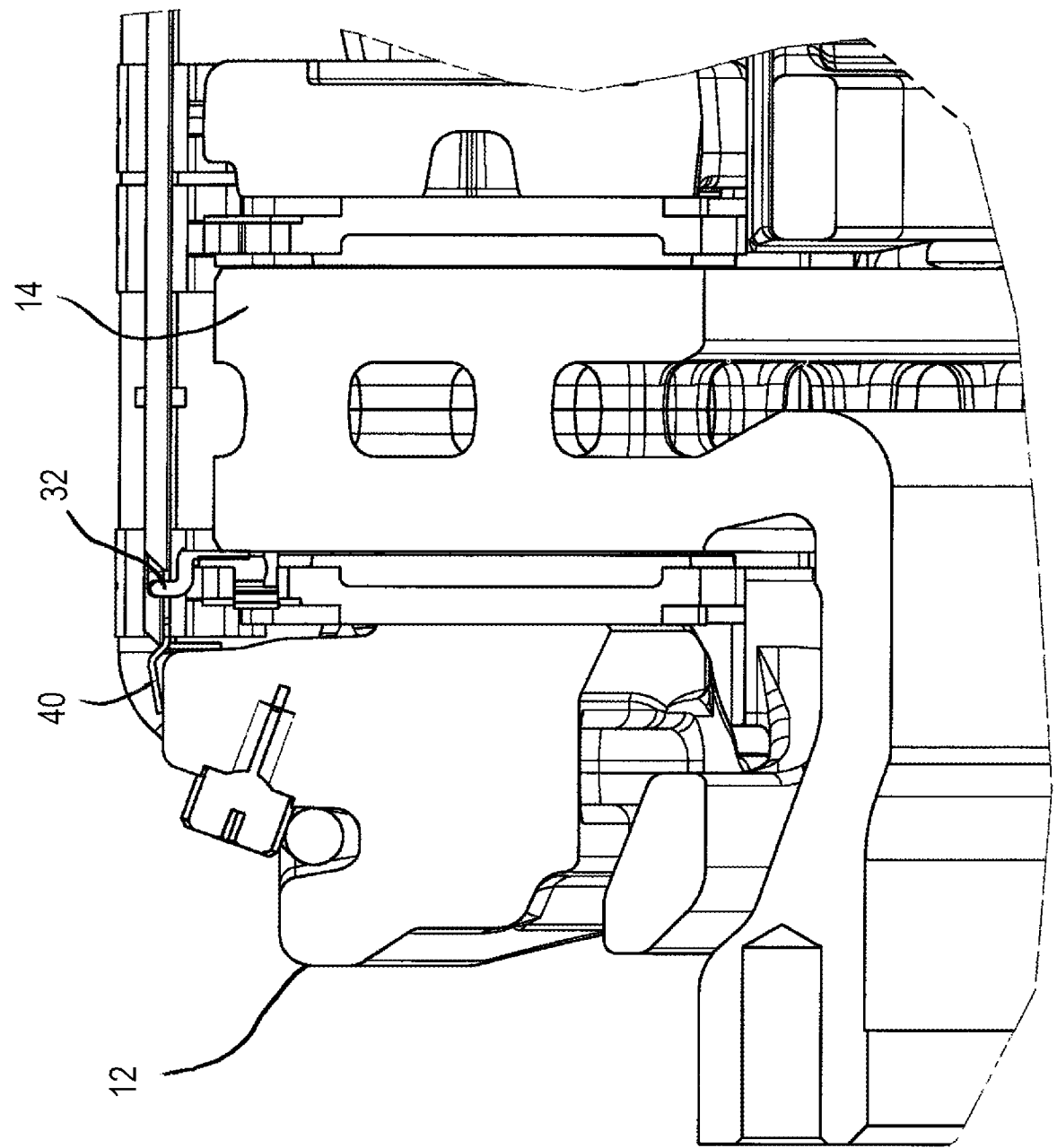

As is particularly apparent in FIG. 2, the sensing piece 32 in the case of the exemplary embodiment illustrated in the drawing is arranged in a groove 42 in the friction lining 43 of the second brake lining 18 and consequently within the friction lining 43, the groove extending in the axial direction of the brake. The sensing piece lies within the radius of the brake disk 14 and is therefore able to make contact with the brake disk, which is why in the event that the first wear limit is reached the signal line 26 that is embedded in the sensing piece 32 comes into contact with the brake disk 14. Alternatively, the sensing piece 32 may however also be molded in the friction lining 43. It may also be completely omitted if the signal line 26 is held in another manner in a suitable position, by way of example in that the signal line 26 is molded directly into the friction lining 43.

Figure 4:
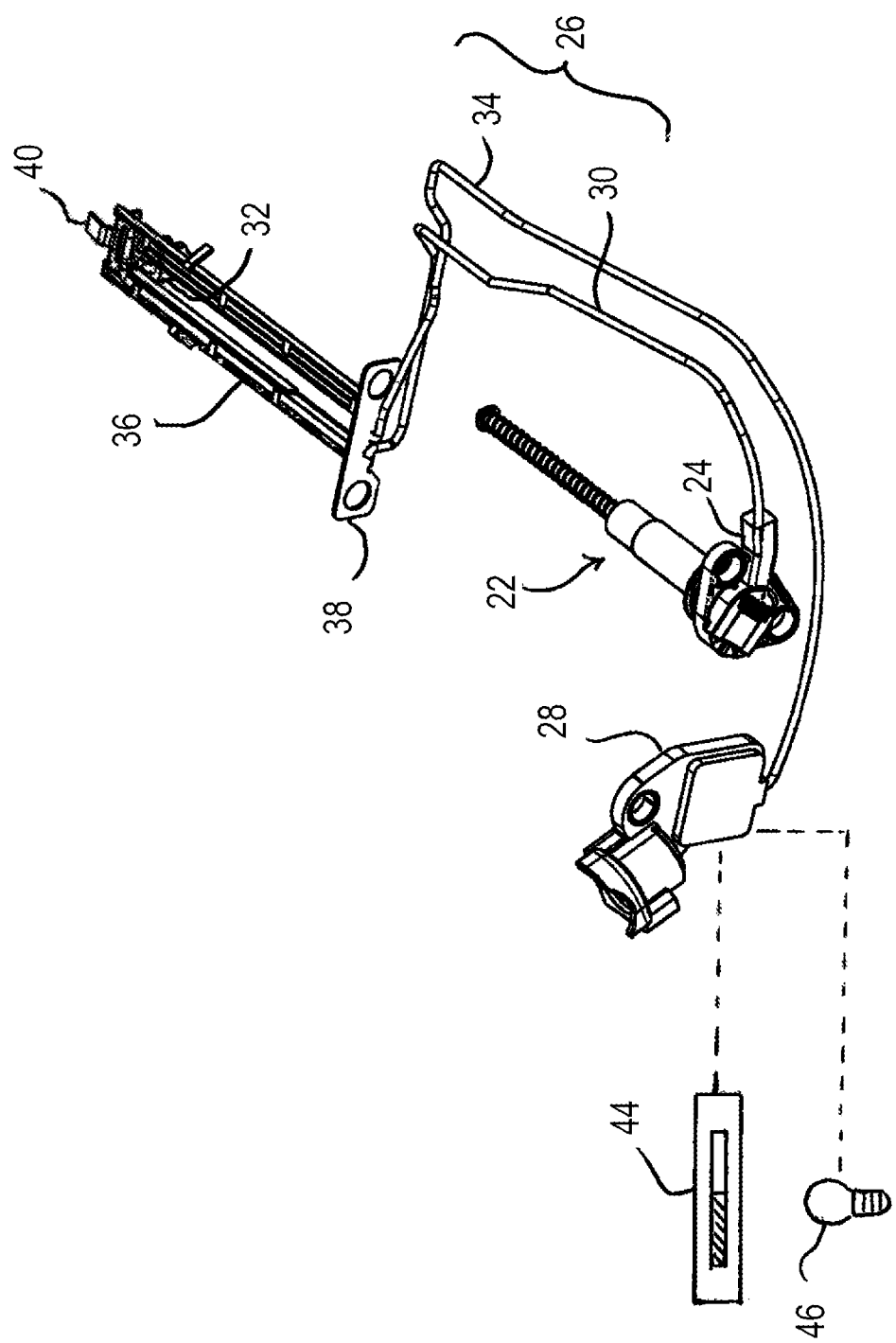
FIG. 4 illustrates an exemplary embodiment of the wear monitoring device in accordance with the invention.

As is apparent in the schematic illustration in FIG. 4, the evaluating unit 28 comprises a display unit 44 that is used for quantitatively displaying the cumulative wear of the first brake lining 16 and second brake lining 18 in the form of a progress bar, and also a warning device 46 in the form of a lamp that flashes in the event that the first wear limit is reached and illuminates continuously in the event that the second wear limit is reached.

In the case of the exemplary embodiment illustrated in the drawing, the evaluating unit 28 outputs an output signal UA depending upon the operating state, the output signal being a simple voltage signal. The signal is then converted in the respective components 44 or 46 into suitable signals for controlling the display unit 44 and the warning device 46. Alternatively, it is however possible to provide that the signal is converted into suitable signals in the evaluating unit 28 itself or is converted in an electronic circuit that is arranged between the evaluating unit 28 on the one hand and the display unit 44 or the warning device 46 on the other hand.

Figure 5:
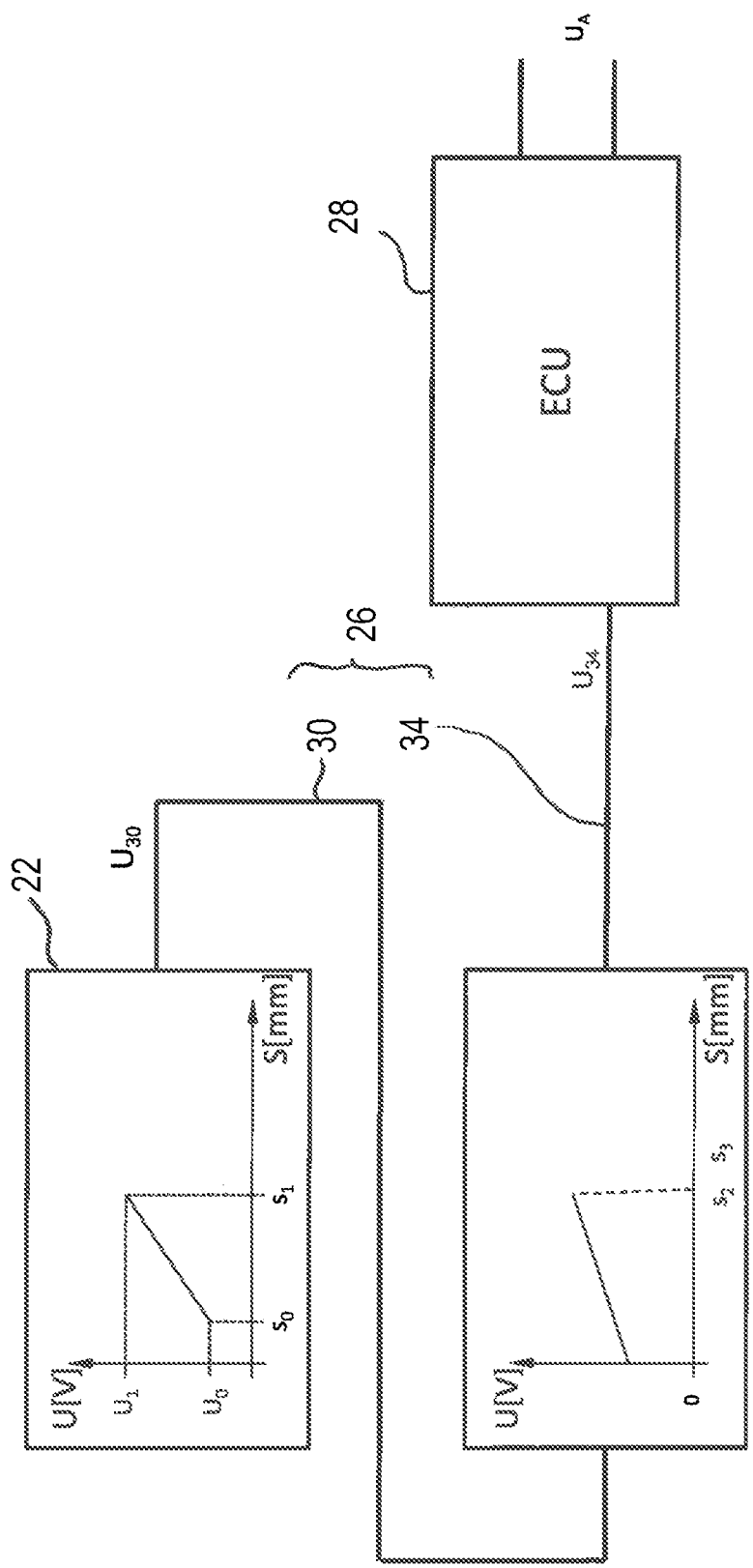
FIG. 5 illustrates a block diagram of the wear monitoring device.

The function of the above illustrated exemplary embodiment of the wear monitoring device in accordance with the invention is explained below in particular with reference to FIG. 5:

The first sensor 22 outputs at its output connection 24 the output signal U30. In the case of new brake linings, the output signal U30 corresponds to the voltage U0. As the cumulative wear increases, the output signal U30 increases until it assumes the value U1. The wear is described in FIG. 5 by the symbol Sn(n=0, 1, 2, 3), wherein S0 corresponds to the (non-existent) wear in the case of new brake linings.

The output signal U30 is output via the signal line 26 to the evaluating unit 28. The evaluating unit 28 is an ECU.

S2 describes the state of wear that represents the first wear limit at which in other words the sensing piece 32 is so well worn that the signal line 26 comes into contact with the brake disk 14.

As already explained above, as a result in accordance with the invention the signal line 26 represents a second sensor. The second sensor is a so-called black-white sensor because in contrast to the first sensor 22 it is not used to output individual values quantitatively but rather only provides information as to whether a limit value is reached, by way of example the first wear limit.

The evaluating unit 28 functions according to the following truth table:

| Truth Table | | |
|---|---|---|
| $U_{30}$ | $U_{34}$ | $U_A$ |
| $U_0 \leq U_{30} \leq U_1$ | $U_{30}$ | $U_{A0} + kU_{34}$ |
| $U_{30} > U_1$ | $U_{30}$ | $U_{A1}$ |
| $U_0 \leq U_{30} \leq U_1$ | 0 | $U_{A2}$ |
| $U_{30} > U_1$ | 0 | $U_{A2}$ |
| $U_0 \leq U_{30} \leq U_1$ | no signal | $U_{A3}$ |
| $U_{S1} > U_1$ | no signal | $U_{A3}$ |

If the first brake lining 16 and the second braking lining 18 are not yet worn, the output signal $U_{30}$ of the first sensor 22 is transmitted (unchanged) via the signal line 26, which is used as the second sensor, as a voltage $U_{34}$ to the evaluating unit 28. The evaluating unit 28 subsequently generates an output signal UA that is proportional to the voltage $U_{34}$ and consequently proportional to the cumulative wear. This output signal UA is displayed by the display unit 44, converted into the form of a progress bar. The progress bar illustrated in FIG. 4 corresponds approximately to half of the admissible cumulative wear of the first brake lining 16 and the second brake lining 18.

If the value $S_1$ of the cumulative wear is reached, a warning signal $U_{A1}$ is output. This warning signal $U_{A1}$ may be implemented in the vehicle in any manner, by way of example by the progress bar of the display unit 44 flashing.

If the wear S2 achieves the wear limit of the second brake lining 18, in other words if the signal line 26 that is embedded in the sensing piece 32 comes into contact with the brake disk 14, the voltage $U_{34}$ drops to zero volts because the voltage corresponds to the potential difference to ground. In this case, the evaluating unit 28 outputs the warning signal $U_{A2}$ that causes the warning device 46 to flash. The user is notified that the second brake lining 18 has almost reached it admissible wear limit, meaning a lining change is imminent.

As may be observed in the truth table, the warning signal $U_{A2}$ is output irrespective of whether the cumulative wear is still within the tolerable range or whether it has already reached the value $S_1$.

If, as described above, the signal line 26 comes into contact with the brake disk 14 during the braking procedure with the result that the potential of the signal line is drawn to ground, then this is initially a temporary phenomenon because the contact between the signal line 26 and the brake disk 14 is interrupted as the brake is released. The evaluating unit 28 is however configured in such a manner that the warning signal $U_{A2}$ is nonetheless still output.

If the vehicle is still to be used despite the warning signal $U_{A2}$, then the second brake lining 18 will eventually become so well worn that the signal line 26 is severed by virtue of making contact with the brake disk 14. This corresponds to the wear $S_3$ in FIG. 5. In this case, the evaluating unit 28 no longer receives an input signal. The evaluating unit subsequently outputs the warning signal $U_{A3}$. In response to this warning signal, the warning unit 46 no longer illuminates in a flashing manner but rather illuminates continuously which notifies the user that the second wear limit of the second brake lining 18 has been reached and therefore the lining is to be changed urgently.

In turn, this means that that the third warning signal $U_{A3}$ is output regardless of what the first sensor 22 reports.

In the above exemplary embodiment, the second brake lining 18 is monitored separately for wear. As already mentioned above, it is also possible to monitor the first brake lining 16 separately. It is also possible within the scope of the invention to monitor the two brake linings 16, 18 separately.

The features of the invention that are disclosed in the above description, the claims and the drawing may be essential both individually and also in any combination in their various embodiments for the implementation of the invention. While the above description constitutes the preferred embodiments of the present invention, it will be appreciated that the invention is susceptible to modification, variation and change without departing from the proper scope and fair meaning of the accompanying claims.

The invention claimed is:

1. A wear monitoring device of a disk brake for commercial vehicles having a brake disk (14), a first brake lining (16), which lies on a first face of the brake disk, and a second brake lining (18), which lies on a second face of the brake disk, the wear monitoring device comprising:

a first sensor unit (22) that quantitatively ascertains the cumulative wear of the first brake lining and second brake lining and outputs, at an output connection (24) of the first sensor unit, a first electrical output signal that is associated with cumulative wear, an evaluating unit (28), and a signal line (26) connected on the one hand to the output connection of the first sensor unit and on the other hand to the evaluating unit, wherein the signal line (26) is arranged in such a manner that, when a predetermined first wear limit of the first brake lining (16) or of the second brake lining (18) is reached, the signal line comes into contact with a stop;

wherein the signal line (26) is arranged in such a manner that, in the event that a predetermined second wear limit of the first brake lining (16) or of the second brake lining (18) is reached, the signal line is severed.

2. The wear monitoring device as claimed in claim 1, wherein the evaluating unit (28) is configured so as, in response to the signal line (26) coming into contact with the stop, to output a first warning signal that is associated with the first wear limit.

3. The wear monitoring device as claimed in claim 1, wherein the stop is configured on a component that has a predetermined electrical potential.

4. The wear monitoring device as claimed in claim 3, wherein the component, on which the stop is configured, is the brake disk (14).

5. The wear monitoring device as claimed in claim 1, wherein the evaluating unit (28) is configured so as to output a second signal in response to the signal line (26) being severed.

6. The wear monitoring device as claimed in claim 1, wherein the signal line (26) lies at least in sections within a friction lining (43) of the first brake lining (16) and of the second brake lining (18).

7. The wear monitoring device as claimed in claim 1, wherein the first sensor unit (22) comprises a potentiometer or a Hall sensor.

8. The wear monitoring device as claimed in claim 1, further comprising a housing which accommodates the evaluating unit (28) and at least one part of the first sensor unit (22).

9. The wear monitoring device as claimed in claim 1, wherein the signal line (26) is an individual component that is separately replaceable.

10. A disk brake comprising a wear monitoring device as claimed in claim 1.

11. A wear monitoring device of a disk brake for commercial vehicles having a brake disk (14), a first brake lining (16), which lies on a first face of the brake disk, and a second brake lining (18), which lies on a second face of the brake disk, the wear monitoring device comprising:

a first sensor unit (22) that quantitatively ascertains the cumulative wear of the first brake lining and second brake lining and outputs, at an output connection (24) of the first sensor unit, a first electrical output signal that is associated with cumulative wear, an evaluating unit (28), and a signal line (26) connected on the one hand to the output connection of the first sensor unit and on the other hand to the evaluating unit, wherein the signal line (26) is arranged in such a manner that, when a predetermined first wear limit of the first brake lining (16) or of the second brake lining (18) is reached, the signal line comes into contact with a stop, wherein the stop has a predetermined electrical potential and alters the first electrical signal during contact while maintaining an electrical signal via the signal line.

12. The wear monitoring device as claimed in claim 11, wherein the evaluating unit (28) is configured so as, in response to the signal line (26) coming into contact with the stop, to output a first warning signal that is associated with the first wear limit.

13. The wear monitoring device as claimed in claim 12, wherein the signal line (26) is arranged in such a manner that, in the event that a predetermined second wear limit of the first brake lining (16) or of the second brake lining (18) is reached, the signal line is severed.

14. The wear monitoring device as claimed in claim 13, wherein the evaluating unit (28) is configured so as to output a second warning signal in response to the signal line (26) being severed.

15. The wear monitoring device of claim 14, wherein the signal cable (26) is configured as a potentiometer, wherein in a first state current passes through the signal cable, wherein in a second state following contact with the stop at the first wear limit an electric potential of the signal cable is reduced, and wherein in a third state following severing of the signal cable at the second wear limit the signal cable has no electric potential.

* * * * *